Jan. 14, 1969  D. B. BROUGHTON  3,422,006
SOLVENT RECOVERY PROCESS
Filed July 26, 1966
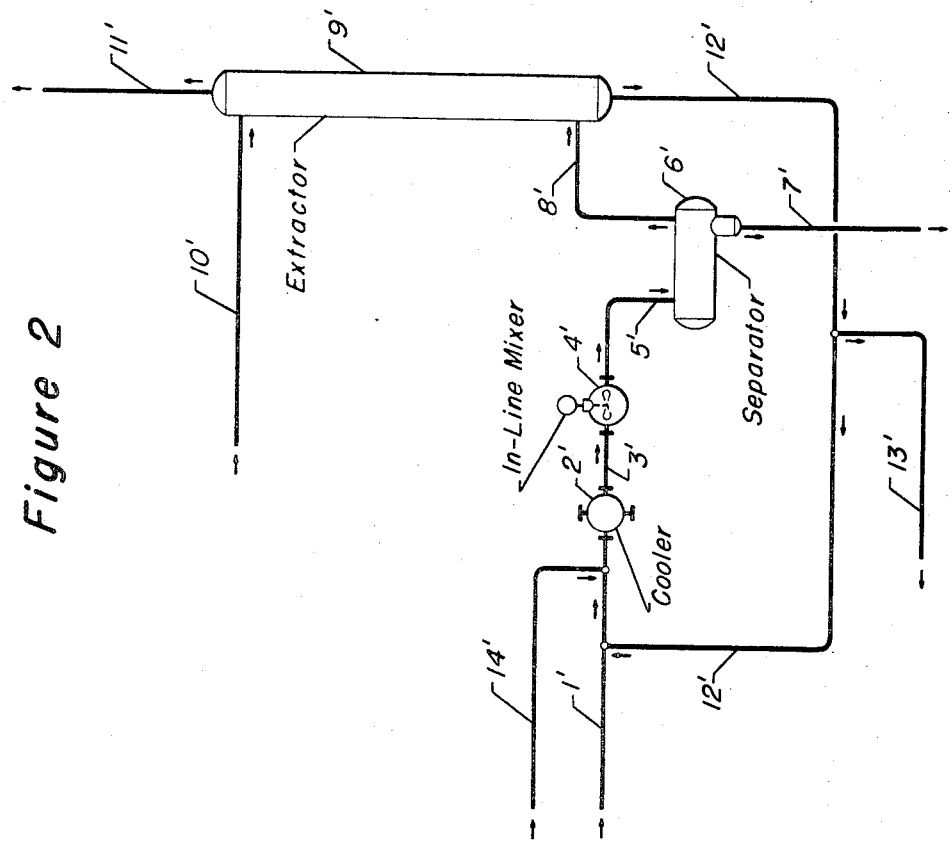
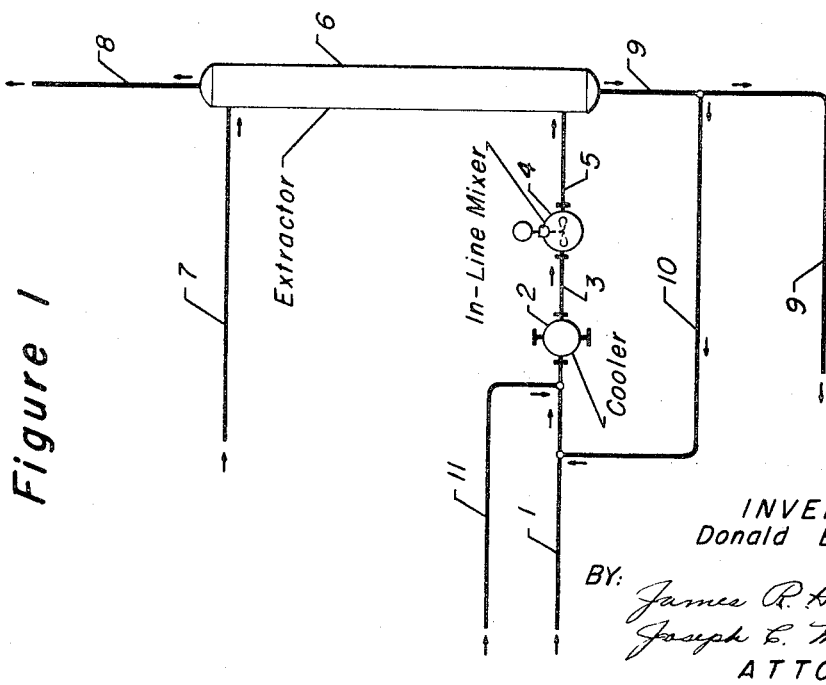
INVENTOR:
Donald B. Broughton
BY:
ATTORNEYS

United States Patent Office 3,422,006
Patented Jan. 14, 1969

3,422,006
SOLVENT RECOVERY PROCESS
Donald B. Broughton, Evanston, Ill., assignor to Universal Oil Products Company, Des Plaines, Ill., a corporation of Delaware
Filed July 26, 1966, Ser. No. 568,023
U.S. Cl. 208—321       18 Claims
Int. Cl. C10g 21/28; C10g 21/16

ABSTRACT OF THE DISCLOSURE

Process for the recovery of primary solvent contained in a raffinate stream produced by a primary extraction process which comprises mixing the raffinate in a conditioning zone with a first stream of secondary solvent under conditions sufficient to render the raffinate stream more readily extractable, passing the resulting mixture of secondary solvent, primary solvent, and conditioned raffinate into an extraction zone wherein it is contacted with a second stream of secondary solvent, and withdrawing from the extraction zone a third stream of secondary solvent and a raffinate stream which is substantially free of primary solvent. In more particular embodiments, a part of the third stream of secondary solvent is sent to the conditioning zone either to provide a part of, or to provide all of the first stream of secondary solvent. In further particular embodiments, a separation zone is contained intermediate to the conditioning zone and the extraction zone whereby a fourth stream of secondary solvent is withdrawn from the process while the conditioned raffinate is passed to the extraction zone. The process has particular application where the primary extraction process is an aromatics extraction process, the raffinate comprises paraffinic hydrocarbons, and the secondary solvent comprises water. Primary solvents recovered within the scope of the inventive process include sulfolane-type chemicals, polyethylene glycols, polypropylene glycols, dimethyl sulfoxide, etc.

---

The present invention relates to the solvent extraction of aromatic hydrocarbons from a hydrocarbon charge stream. More particularly, the present invention relates to the recovery of solvent from the paraffinic raffinate produced by the solvent extraction of aromatics from a hydrocarbon charge stream. Most specifically, the present invention relates to an improved process for the recovery of solvent from the paraffinic raffinate by means of a secondary extraction process.

It is well known in the art that the paraffinic raffinate which leaves the extraction zone of an aromatic hydrocarbon extraction process contains solvent. The solvent which is withdrawn in the raffinate stream must be recovered not only because it may interfere with subsequent raffinate processing or ultimate raffinate use, but primarily because continual loss of solvent in the raffinate stream is a prohibitive economic expense in the aromatic extraction process. The recovery of the solvent from the raffinate stream may be accomplished by distillation, or adsorption, or by a secondary solvent extraction process.

A typical solvent which is utilized in commercial aromatics extraction and which may be recovered in accordance with the practice of this invention is a solvent of the sulfolane type. The solvent possesses a five membered ring containing one atom of sulfur and four atoms of carbon, with two oxygen atoms bonded to the sulfur atom of the ring. Generically, the sulfolane type solvents may be indicated as having the following structural formula:

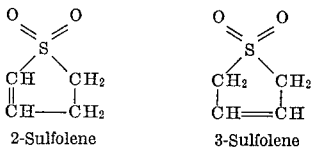

wherein $R_1$, $R_2$, $R_3$ and $R_4$ are independently selected from the group comprising a hydrogen atom, an alkyl group having from one to ten carbon atoms, an alkoxy radical having from one to eight carbon atoms, and an arylalkyl radical having from one to twelve carbon atoms. Other solvents which may be included within this process are the sulfolenes such as 2-sulfolene or 3-sulfolene which have the following structures:

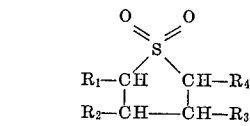

2-Sulfolene        3-Sulfolene

Other typical solvents which have a high selectivity for separating aromatics from non-aromatic hydrocarbons and which may be processed within the scope of the present invention are 2-methylsulfolane, 2,4-dimethylsulfolane, methyl 2-sulfonyl ether, n-aryl-3-sulfonyl amine, 2-sulfonyl acetate, diethylene glycol, various polyethylene glycols, dipropylene glycol, various polypropylene glycols, dimethyl sulfoxide, N-methyl pyrollidone, etc. The specificallly preferred solvent chemical which is processed within the scope of the present invention is sulfolane, having the following structural formula:

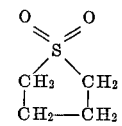

Because the typical solvents which are utilized in aromatics extraction are water soluble, it is the practice to extract the solvent from the raffinate stream by contact with an aqueous stream in a subsequent extraction means. The extraction of the solvent from the raffinate with water may be undertaken in any suitable liquid-liquid contacting means as in a tower containing suitable packing such as Berl saddles or Raschig rings, or in a tower containing suitable trays, or in a rotating disc contactor (RDC). The solvent may then be readily recovered from the aqueous solution by distillation.

It has been discovered in the commercial aromatics extraction units that the recovery of solvent sulfolane from the raffinate by extraction with water does not correspond to the recovery which is to be anticipated based upon solubility data, and the assumption of reasonable efficiency of the extractor. The loss of sulfolane in the raffinate product has been found to be from five to eight times as great as anticipated, and this loss is greatly above what is economically desirable.

It is obvious in the art to provide additional physical stages in the aqueous extractor in order to achieve the required recovery of the sulfolane solvent. Such a solution to the problem of poor extraction efficiency is technically feasible, but it is not a preferred solution since it requires that the number of physical stages in the aqueous extractor must be more than doubled. Not only is this a prohibitively uneconomical expedient, but once a commercial unit has been placed on-stream it is often a physical impossibility to modify the existing facility to provide the required additional contacting stages. The preferred solution to the problem is, therefore, to subject the solvent rich raffinate stream to conditions which will render the raffinate stream more readily extractable in the existing aqueous extraction means.

It is therefore an object of the present invention to provide a process for the recovery of water soluble solvent from a paraffinic raffinate stream by aqueous extraction. It is a particular object of the present invention to provide a means for the recovery of water soluble solvent from a paraffinic raffinate stream in an aqueous extraction means containing a minimum number of physical stages. It is a more specific object of the present invention to minimize the number of physical stages in the aqueous extraction means by first subjecting the solvent containing raffinate stream to conditions sufficient to render the raffinate stream more readily extractable.

It has been determined that these objectives may be achieved by bringing the paraffinic raffinate stream into contact with an aqueous phase in a conditioning zone of high turbulence before the solvent-containing raffinate stream is introduced into the aqueous extraction means.

Therefore in accordance with the practice of the present invention, one embodiment comprises mixing a solvent-containing raffinate stream in a conditioning zone with a hereinafter specified first aqueous stream under conditions sufficient to render said raffinate stream more readily extractable in a subsequent aqueous extraction means; passing the resulting mixture into said aqueous extraction means wherein the conditioned raffinate is contacted under extraction conditions with a second aqueous stream; withdrawing from the extraction means a raffinate stream which is substantially free of solvent; withdrawing from the aqueous extraction means a third aqueous stream; and sending a part of the third aqueous stream to the conditioning zone as said specified first aqueous stream.

A further embodiment of this invention comprises mixing a solvent-containing raffinate stream in a conditioning zone with a hereinafter specified first aqueous stream under conditions sufficient to render the raffinate stream more readily extractable in a subsequent aqueous extraction means; passing the resulting mixture to a separation means under conditions sufficient to provide a second aqueous stream and a stream of conditioned raffinate; introducing the stream of conditioned raffinate into the aqueous extraction means wherein the raffinate is contacted under extraction conditions with a third aqueous stream; withdrawing from the extraction means a raffinate stream which is substantially free of solvent; withdrawing from the extraction means a fourth aqueous stream; and sending at least a part of said fourth aqueous stream to the conditioning zone as said specified first aqueous stream.

The process of the present invention is clearly set forth in the accompanying figures. FIGURE I consists of a schematic flow diagram illustrating the first broad embodiment and FIGURE II consists of a schematic flow diagram illustrating the second broad embodiment.

While the poor recovery of sulfolane solvent from the raffinate by aqueous extraction may be the result of any number of influences, it is believed that the primary cause is the presence of an entrained sulfolane phase within the raffinate stream. The raffinate leaves the amomatics extraction zone at an elevated temperature in the range of from 150°–250° F. but normally at 210° F. The raffinate stream must therefore be passed through a heat exchanger and cooled before it is passed into the aqueous extractor for the recovery of the sulfolane solvent. In cooling the raffinate from 210° F. to 100° F. or less, the solubility of sulfolane in the raffinate is reduced from the range of 1.5 to 2.0 mole percent to the range of about 0.5 to 0.7 mole percent, the solubility of sulfolane being dependent not only upon the temperature of the raffinate but also upon the mole percent of aromatic hydrocarbon contained therein. At 100° F. a separate phase of sulfolane solvent should therefore appear in the raffinate stream.

Samples of a given raffinate stream taken after cooling and prior to its entry into the aqueous extraction column will frequently indicate that the raffinate is not clear and transparent as anticipated, but rather that it is hazy and translucent or even opaque. The haze which is contained in the raffinate is comprised of sulfolane which came out of solution upon cooling and which did not coalesce to form a distinct sulfolane phase separate from the raffinate phase. It has been determined in the laboratory that this haze or mist of microdroplets of sulfolane cannot be readily coalesced by merely allowing the sample to stand, and that it cannot be readily coalesced by adding dispersed drops of water to the raffinate or by passing dispersed drops of raffinate up through a water phase.

It is therefore speculated that the relatively poor recovery of sulfolane from the raffinate occurs because the haze in the raffinate does not coalesce in the aqueous extractor. Thus the free sulfolane phase which is readily soluble in water remains dispersed in the raffinate and does not come into contact with the aqueous phase and thereby go into solution. It is believed that as the raffinate passes up through the aqueous extractor as a dispersed hydrocarbon phase, the sulfolane in solution within each drop of hydrocarbon will diffuse to the surface of the drop and be transported across the interface of the hydrocarbon and water thereby passing into the aqueous solution. However, the mist of microdroplets of free sulfolane phase within a given drop of raffinate hydrocarbon cannot so migrate and pass into the aqueous solution. As sulfolane passes out of the hydrocarbon solution and into the aqueous phase, the microdroplets of sulfolane will go into solution in the hydrocarbon drop. The drop of hydrocarbon will thereby remain saturated with sulfolane of solution until all microdroplets of free sulfolane are dissolved. It is only at this point then that the aqueous extraction can be at all effective in reducing the concentration of sulfolane in the raffinate in accordance with the known equilibrium data.

Thus the raffinate is not readily extractable until it has been freed of the haze of sulfolane microdroplets and it is only then that the aqueous extractor will function as designed. The extractor means, having been designed on the basis of the 100° F. sulfolane solubility, cannot function as designed since the presence of the sulfolane phase microdroplets within the raffinate phase effectively results in a higher sulfolane concentration which is equivalent to the original solubility of sulfolane in the raffinate at 210° F. The net result is that the concentration of sulfolane in the raffinate leaving the aqueous extractor will be from five to eight times as great as the design concentration.

It has been determined that solvent-rich raffinate may be rendered readily extractable by contacting the hazy raffinate stream with an aqueous phase under conditions of high turbulence. It is found in the laboratory that if a tube of hazy raffinate is violently agitated, the haze or mist does not disappear. The ratio of the hydrocarbon phase to the free solvent phase is so high, the sulfolane haze comprising only from 0.8 to 1.5 mole percent, that the mist of microdroplets of free sulfolane phase cannot coalesce despite the turbulence. If the tube of hazy raffinate is given one or two manual shakes with a large volume of water, however, the sulfolane mist immediately disappears into the aqueous phase leaving a clear transparent supernatant raffinate phase which contains dissolved sulfolane solvent. The presence of the free aqueous phase in the turbulent zone reduces the ratio of the hydrocarbon phase to non-hydrocarbon phase sufficiently to allow the mist of sulfolane microdroplets to be coalesced and dissolved by the water.

The equivalent effect is achieved in the inventive process by providing that the cooled paraffinic raffinate is contacted with an aqueous phase in a conditioning zone of high turbulence before the solvent-containing raffinate is introduced into the aqueous extraction means. It has been determined that in the practice of the present invention the solvent-containing raffinate will be rendered most readily extractable when the ratio of hydrocarbon phase to nonhydrocarbon phase in the turbulent conditioning zone is reduced to a level in the range of 5:1–3:1. The inventive process may be more readily understood by the following specific embodiments.

Referring now to the first broad embodiment of the present invention as set forth in FIGURE I, a paraffinic raffinate stream containing sulfolane solvent in solution leaves an aromatics extraction zone and enters the process of the present invention by means of line 1 at a temperature of from 150° F. to 250° F. and normally at a temperature of 200° F. to 210° F. The raffinate stream is then contacted with an aqueous stream which enters line 1 by means of line 10 from a source hereinafter specified. The mixed stream then enters heat exchanger 2 wherein it is cooled to about 100° F. or less and wherein about two thirds of the dissolved sulfolane leaves the hydrocarbon solution. The cooled stream then passes via line 3 into an in-line mixer means 4 wherein the aqueous phase is intimately contacted with the hydrocarbon phase under sufficient conditions of turbulence and under a sufficiently reduced ratio of hydrocarbon phase to nonhydrocarbon phase, to provide that no mist or haze of free sulfolane solvent remains in the raffinate hydrocarbon. The in-line mixer 4 may comprise a motor driven propeller or turbine mixer, or a series of mixing orifices, or any other suitable mixing apparatus sufficient to provide high turbulence and thereby condition the raffinate hydrocarbon for subsequent aqueous extraction. The mixed stream of conditioned raffinate phase and sulfolane-containing aqueous phase leaves mixer means 4 via line 5 and enters an aqueous extractor means 6 wherein the conditioned raffinate is contacted with an aqueous stream entering extractor means 6 by way of line 7. The aqueous stream of line 7 may consist of fresh water but normally it is comprised of stripping steam condensate from the aromatics extraction process unit. Extractor 6 may comprise any suitable liquid-liquid contacting means as tower containing a suitable packing such as Berl saddles or Raschig rings, or a tower containing suitable tray devices, or a rotating disc contactor. The conditioned raffinate is extracted by the aqueous phase contained in extractor 6 and a raffinate stream substantially free from sulfolane solvent is withdrawn from the inventive process via line 8. An aqueous stream containing the extracted sulfolane leaves the extractor means 6 via line 9 and a part of this stream is sent back to line 1 via line 10 as the aqueous stream specified hereinabove. The remaining part of this aqueous stream is withdrawn via line 9, and it may be sent to further processing for the recovery of the sulfolane solvent contained therein.

A further embodiment of the inventive process as set forth in FIGURE I is the introduction of an aqueous stream into line 1 by means of line 11. This aqueous stream may be obtained from a fresh water supply or from the same source as the aqueous stream of line 7. The aqueous stream of line 11 will be as effective in conditioning the raffinate by removal of sulfolane haze or mist as is the aqueous stream of line 10, and it may replace in part or in whole the circulating aqueous stream of line 10. However, it is the preferred embodiment of the inventive process not to introduce external water via line 11, but to circulate the aqueous stream of line 10 as set forth in the preceding paragraph.

The second broad embodiment of the inventive process is illustrated by FIGURE II wherein a paraffinic raffinate stream containing sulfolane solvent in solution enters the inventive process by means of line 1' at a temperature of from 150° F. to 250° F. and normally at a temperature of 200° F. to 210° F. The raffinate stream is then contacted with an aqueous stream which enters line 1' by means of line 12' from a source hereinafter specified. The mixed stream then enters heat exchanger 2' wherein it is cooled to about 100° F. or less and wherein about two thirds of the dissolved sulfolane leaves the hydrocarbon solution. The cooled stream then passes via line 3' into an in-line mixer means 4' wherein the aqueous phase is intimately contacted with the hydrocarbon phase under sufficient conditions of turbulence and under a sufficiently reduced ratio of hydrocarbon phase to non-hydrocarbon phase, to provide that no mist or haze of free sulfolane solvent remains in the raffinate hydrocarbon. The in-line mixer may comprise a motor driven propeller or turbine mixer, or a series of mixing orifices, or any other suitable mixing apparatus sufficient to provide high turbulence and thereby condition the raffinate hydrocarbon for subsequent aqueous extraction. The mixed stream of conditioned raffinate phase and sulfolane-containing aqueous phase leaves mixer means 4' via line 5' and enters separator 6' wherein the hydrocarbon phase and aqueous phase are separated. An aqueous stream containing dissolved sulfolane solvent leaves separator 6' via line 7' and may then be sent to subsequent processing for recovery of the solvent sulfolane. The conditioned raffinate hydrocarbon containing sulfolane in solution but free from sulfolane haze leaves separator 6' by means of line 8' and enters an aqueous extractor means 9'. Extractor 9' may comprise any suitable liquid-liquid contacting means as a tower containing suitable packing such as Berl saddles or Raschig rings, or a tower containing suitable tray devices, or a rotating disc contactor. An aqueous stream which may comprise fresh water but which is normally derived from the aromatic extraction process unit enters extractor means 9' via line 10' and extracts the sulfolane solvent from the conditioned reaffinate. The resulting paraffinic raffinate having substantial freedom from sulfolane leaves the extractor via line 11', while an aqueous stream containing sulfolane leaves the extractor via line 12' and at least a part of this aqueous stream is returned to line 1' as the aqueous stream specified hereinabove. If it is desired to only circulate a part of the aqueous stream in line 12' and thereby reduce the size of separator 6', the uncirculated portion may be withdrawn from line 12' by means of line 13'. The uncirculated portion may then be combined with the aqueous stream of line 7' and sent to subsequent processing for the recovery of the sulfolane solvent.

A modification of the inventive process as set forth in the embodiment of FIGURE II is the introduction of an aqueous stream into line 1' by means of line 14'. This aqueous stream may be derived from a fresh water source or it may be obtained from the aromatics extraction process unit as is the aqueous stream in line 10'. The aqueous stream of line 14' will be as effective in conditioning the raffinate by removal of sulfolane haze or mist as is the aqueous stream of line 12', and it may replace in part or in whole the circulating aqueous stream of line 12'. It is the preferred embodiment of the inventive process, however, not to introduce the aqueous stream of line 14', but to circulate the aqueous stream of line 12' as set forth in the preceding paragraph.

A greater understanding of the effectiveness of the inventive process will be obtained by reference to the following examples. Example I consists of a commercial system for the recovery of sulfolane from a paraffinic raffinate as experience in the prior art. Example II illustrates the benefits derived by the practice of the present invention in a preferred embodiment for the same commercial system.

EXAMPLE I

The paraffinic raffinate from an aromatics extraction process unit enters the process of FIGURE I at a rate of 9525 b.p.s.d. (barrels per stream day at 60° F.). The raffinate comprises hydrocarbon species having from about six to eight carbon atoms per molecule and has an effective molecular weight of 93.2 due to the presence of dissolved sulfolane solvent. The raffinate has a gravity of 73.3° API at 60° F. and contains 4.3 mole percent aromatic hydrocarbons. The raffinate leaves the aromatic extraction means at 210° F. and contains about 1.2 mole percent of sulfolane solvent in solution.

Referring now to FIGURE I, the paraffinic raffinate enters line 1 at 210° F. at a rate of 95,860 lb.s/hr. comprising 94,470 lbs./hr. of hydrocarbon and 1390 lbs./hr. of sulfolane. No aqueous stream is introduced into line 1 and the raffinate enters cooler 2 wherein it is cooled to 100° F. The cooled raffinate stream by-passes in-line mixer means 4 and enters aqueous extraction means 6 which comprises a rotating disc contactor containing forty mechanical stages (rotating discs between static doughnuts).

Stripping steam condensate from the aromatics extraction process unit enters RDC column 6 (rotating disc contactor) via line 7 at a rate of 636 b.p.s.d. or at an hourly rate of 9270 lbs./hr. This aqueous stream enters RDC column 6 at 110° F. and extracts sulfolane solvent from the dispersed raffinate hydrocarbon. The resulting aqueous stream leaves the bottom of RDC column 6 at 100° F. via line 9 at a rate of 10,645.8 lbs./hr. or 711 b.p.s.d. This stream is comprised of 9270 lbs./hr. of water and 1375.8 lbs./hr. of sulfolane and may be sent to subsequent distillation means for recovery of the sulfolane. The extracted paraffinic raffinate leaves the top of RDC column 6 via line 8 at 105° F. at a rate of 94,484.2 lbs./hr. or 9450 b.p.s.d. The extracted raffinate comprises 94,470 lbs./hr. of hydrocarbon and 14.2 lbs./hr. of sulfolane and has a gravity of 74.7° API at 60° F. and a molecular weight of 92.9.

EXAMPLE II

The paraffinic raffinate defined in Example I, above, enters the process of FIGURE I via line 1 at 210° F. and at a rate of 9525 b.p.s.d. The raffinate stream is comprised of 94,470 lbs./hr. of hydrocarbon and 1390 lbs./hr. of sulfolane solvent. An aqueous stream, to be specified hereinbelow, enters line 1 by means of line 10 at 100° F. at a rate of 2360 b.p.s.d. or 35,380 lbs./hr. The aqueous stream comprises 30,773.5 lbs./hr. of water and 4606.5 lbs./hr. of dissolved sulfolane. The raffinate stream and the aqueous stream enter heat exchanger means 2 via line 1 and the combined stream is cooled to 100° F. and is passed via line 3 into mixer means 4. Mixer means 4 comprises a motor driven propeller type in-line mixer apparatus wherein the cooled stream is violently agitated and intimately mixed in order to condition the raffinate for aqueous extraction. By means of line 5, the resulting mixture enters the aqueous extractor means 6 which comprises the RDC column defined in Example I above. The aqueous stream of line 7, previously defined in Example I, enters RDC column 6 at 110° F. at a rate of 636 b.p.s.d. or 9270 lbs./hr. This aqueous stream extracts sulfolane from the dispersed raffinate phase and joins with the aqueous portion of the mixed stream entering the bottom of RDC column 6 via line 5. The total aqueous stream leaves column 6 via line 9 at 100° F. and at a rate of 3071 b.p.s.d. or 46,037.6 lbs./hr. This aqueous stream, comprising 40,043.5 lbs./hr. of water and 5994.1 lbs./hr. of dissolved sulfolane, is divided to provide a portion of 2360 b.p.s.d. or 35,380 lbs./hr. which is circulated via line 10 to line 1 as the aqueous stream specified hereinabove. The remaining portion of 711 b.p.s.d. or 10,657.6 lbs./hr., comprising 9270 lbs./hr. of water and 1387.6 lbs./hr. of sulfolane, is withdrawn via line 9 for subsequent recovery of the sulfolane solvent. The final raffinate product leaves RDC column 9 at 105° F. via line 8 at a rate of 9450 b.p.s.d. or 94,472.4 lbs./hr. The raffinate, having a molecular weight of 92.9 and a gravity of 74.7° API at 60° F., is comprised of 94,470 lbs./hr. of hydrocarbon and 2.4 lbs./hr. of sulfolane.

It will be seen from the foregoing examples that aqueous extraction of sulfolane from the raffinate in accordance with the existing art resulted in a loss of sulfolane of 14.2 lbs./hr. or 340.8 lbs./day, while the practice of the present invention reduced the loss of solvent in the raffinate to only 2.4 lbs./hr. or 57.6 lbs./day. This beneficial reduction of solvent loss was accomplished by circulating the sulfolane rich aqueous stream leaving the bottom of the RDC extractor to provide an aqueous phase in the mixer means conditioning zone at a rate equal to 24.8 volume percent of the paraffinic raffinate rate. Thus the ratio of hydrocarbon phase to non-hydrocarbon phase in the conditioning zone was 4:1. An increase in the rate of the aqueous stream will cause a corresponding reduction of the solvent loss but the effectiveness will not be linear. The effectiveness of the present invention is influenced not only by the rate of circulation of the aqueous stream but also by the degree of turbulence in the conditioning zone, the temperature of the cooled raffinate stream entering the conditioning zone, the solvent content of the raffinate entering the inventive process from the aromatics extraction unit, the operating conditions within the aqueous extraction means, etc. It must be further noted that the solvent content of the paraffinic raffinate will vary since it is dependent upon the temperature level of the preceding aromatics extraction process unit and the mole percent of aromatics remaining in the raffinate. It is therefore not possible to define specifically the rate of circulation of the aqueous stream to the conditioning zone which will be required to effectuate a given reduction in solvent loss. However, the effectiveness of the present invention may be typified by the following table of data.

| Raffinate to aqueous extraction, b.p.s.d. | Aromatics in paraffinic raffinate mole percent | Aqueous stream circulated to conditioning zone, b.p.s.d. | Ratio of hydrocarbon phase to aqueous phase | Sulfolane in extracted raffinate, p.p.m. |
|---|---|---|---|---|
| 1,000 | 4.0 | 0 | --- | 150 |
| 1,000 | 4.0 | 50 | 20 | 95 |
| 1,000 | 4.0 | 100 | 10 | 65 |
| 1,000 | 4.0 | 200 | 5 | 30 |
| 1,000 | 4.0 | 300 | 3.33 | 20 |

It will be noted that in the disclosed embodiments and in the illustrative figures and examples, the aqueous phase which is introduced into the solvent-containing raffinate stream enters the raffinate stream before the heat exchanger means. While this is the preferred point of introduction for the aqueous stream, the inventive process is equally effective when the aqueous stream is introduced between the cooler 2 or 2' and the in-line mixer 4 or 4'.

The invention claimed is:
1. Process for extraction of sulfolane type water soluble primary solvent contained in a raffinate stream produced by a primary extraction process, wherein cooling inherently produces a mist of free primary solvent phase in said raffinate stream, which comprises:
  (a) mixing said solvent-containing raffinate stream in a conditioning zone with a hereinafter specified first stream of an aqueous secondary solvent under conditions sufficient to produce a conditioned raffinate substantially free of primary solvent mist and thereby render said raffinate stream more readily extractable in extraction means specified;
  (b) passing the resulting mixture into specified extraction means wherein said conditioned raffinate is contacted under extraction conditions with a second stream of secondary solvent;
  (c) withdrawing from the extraction means a raffinate stream which is substantially free of primary solvent; and,

(d) withdrawing from the extraction means a third stream of secondary solvent and sending a part of said third stream to the conditioning zone as the specified first stream of secondary solvent.

2. Process of claim 1 wherein said raffinate comprises a paraffinic hydrocarbon stream, said primary extraction process comprises an aromatics extraction process, said secondary solvent comprises water, and said primary solvent comprises a sulfolane type chemical of the general formula:

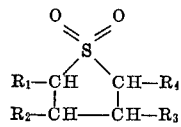

wherein $R_1$, $R_2$, $R_3$, and $R_4$ are independently selected from the group comprising a hydrogen atom, an alkyl group having from one to ten carbon atoms, an arylalkyl radical having from one to twelve carbon atoms, and an alkoxy radical having from one to eight carbon atoms.

3. Process of claim 2 wherein said primary solvent is sulfolane.

4. Process of claim 1 wherein said raffinate comprises a paraffinic hydrocarbon stream, said primary extraction process comprises an aromatics extraction process, said secondary solvent comprises water, and said primary solvent comprises a sulfolene selected from the group consisting of 2-sulfolene and 3-sulfolene.

5. Process for extraction of sulfolane type water soluble primary solvent contained in a raffinate stream produced by a primary extraction process, wherein cooling inherently produces a mist of free primary solvent phase in said raffinate stream, which comprises:
(a) mixing said solvent-containing raffinate stream in a conditioning zone with a first stream of an aqueous secondary solvent under conditions sufficient to produce a conditioned raffinate substantially free of primary solvent mist and thereby render said raffinate stream more readily extractable in extraction means specified;
(b) passing the resulting mixture into specified extraction means wherein said conditioned raffinate is contacted under extraction conditions with a second stream of secondary solvent; and,
(c) withdrawing from the extraction means a third stream of secondary solvent and a raffinate stream which is substantially free of primary solvent.

6. Process of claim 5 wherein a part of said third stream of secondary solvent is sent to said conditioning zone.

7. Process of claim 5 wherein said raffinate comprises a paraffinic hydrocarbon stream, said primary extraction process comprises an aromatic extraction process, said secondary solvent comprises water, and said primary solvent comprises a sulfolane type chemical of the general formula:

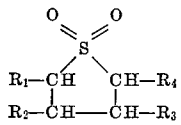

wherein $R_1$, $R_2$, $R_3$, and $R_4$ are independently selected from the group comprising a hydrogen atom, an alkyl group having from one to ten carbon atoms, an arylalkyl radical having from one to twelve carbon atoms, and an alkoxy radical having from one to eight carbon atoms.

8. Process of claim 7 wherein said primary solvent is sulfolane.

9. Process of claim 5 wherein said raffinate comprises a paraffinic hydrocarbon stream, said primary extraction process comprises an aromatics extraction process, said secondary solvent comprises water, and said primary solvent comprises a sulfolene selected from the group consisting of 2-sulfolene and 3-sulfolene.

10. Process for extraction of sulfolane type water soluble primary solvent contained in a raffinate stream produced by a primary extraction process, wherein cooling inherently produces a mist of free primary solvent phase in said raffinate stream, which comprises:
(a) mixing said solvent-containing raffinate stream in a conditioning zone with a hereinafter specified first stream of an aqueous secondary solvent under conditions sufficient to produce a conditioned raffinate substantially free of primary solvent mist and thereby render said raffinate stream more readily extractable in extraction means specified;
(b) passing the resulting mixture to separation means under conditions sufficient to provide a second stream of secondary solvent and a stream of conditioned raffinate;
(c) introducing said stream of conditioned raffinate into specified extraction means wherein the raffinate is contacted under extraction conditions with a third stream of secondary solvent;
(d) withdrawing from the extraction means a raffinate stream which is substantially free of solvent; and,
(e) withdrawing from the extraction means a fourth stream of secondary solvent and sending at least a part of said fourth stream to the conditioning zone as the specified first stream of secondary solvent.

11. Process of claim 10 wherein said raffinate comprises a paraffinic hydrocarbon stream, said primary extraction process comprises an aromatic extraction process, said secondary solvent comprises water, and said primary solvent comprises a sulfolane type chemical of the general formula:

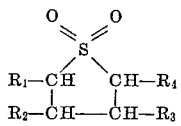

wherein $R_1$, $R_2$, $R_3$, and $R_4$ are independently selected from the group comprising a hydrogen atom, an alkyl group having from one to ten carbon atoms, an arylalkyl radical having from one to twelve carbon atoms, and an alkoxy radical having from one to eight carbon atoms.

12. Process of claim 11 wherein said primary solvent is sulfolane.

13. Process of claim 10 wherein said raffinate comprises a paraffinic hydrocarbon stream, said primary extraction process comprises an aromatics extraction process, said secondary solvent comprises water, and said primary solvent comprises a sulfolene selected from the group consisting of 2-sulfolene and 3-sulfolene.

14. Process for extraction of sulfolane type water soluble primary solvent contained in a raffinate stream produced by a primary extraction process, wherein cooling inherently produces a mist of free primary solvent phase in said raffinate stream, which comprises:
(a) mixing said solvent-containing raffinate stream in a conditioning zone with a first stream of an aqueous secondary solvent under conditions sufficient to produce a conditioned raffinate substantially free of primary solvent mist and thereby render said raffinate stream more readily extractable in extraction means specified;
(b) passing the resulting mixture to separation means under conditions sufficient to provide a second stream of secondary solvent and a stream of conditioned raffinate;
(c) introducing said stream of conditioned raffinate into specified extraction means wherein the raffinate is contacted under extraction conditions with a third stream of secondary solvent;
(d) withdrawing from the extraction means a raffinate stream which is substantially free of solvent; and, (e) withdrawing from the extraction means a fourth stream of secondary solvent.

15. Process of claim 14 wherein at least a part of said fourth stream of secondary solvent is sent to the conditioning zone.

16. Process of claim 14 wherein said raffinate comprises a paraffinic hydrocarbon stream, said primary extraction process comprises an aromatic extraction process, said secondary solvent comprises water, and said primary solvent comprises a sulfolane type chemical of the general formula:

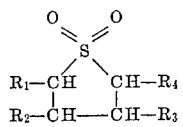

wherein $R_1$, $R_2$, $R_3$, and $R_4$ are independently selected from the group comprising a hydrogen atom, an alkyl group having from one to ten carbon atoms, an arylalkyl radical having from one to twelve carbon atoms, and an alkoxy radical having from one to eight carbon atoms.

17. Process of claim 16 wherein said primary solvent is sulfolane.

18. Process of claim 14 wherein said raffinate comprises a paraffinic hydrocarbon stream, said primary extraction process comprises an aromatics extraction process, said secondary solvent comprises water, and said primary solvent comprises a sulfolene selected from the group consisting of 2-sulfolene and 3-sulfolene.

References Cited

UNITED STATES PATENTS

| | | | |
|---|---|---|---|
| 2,370,530 | 2/1945 | Gage | 208—321 |
| 2,999,892 | 9/1961 | Papadopoulos et al. | 260—674 |
| 3,338,824 | 8/1967 | Oliver | 208—321 |
| 2,529,274 | 11/1950 | Arnold et al. | 208—321 |
| 2,727,848 | 12/1955 | Georgian | 208—321 |

FOREIGN PATENTS 993,394   5/1965   Great Britain.

DELBERT E. GANTZ, Primary Examiner.

H. LEVINE, Assistant Examiner.

U.S. Cl. X.R.

208—325, 333